United States Patent [19]

Sawano et al.

[11] Patent Number: 5,642,140
[45] Date of Patent: Jun. 24, 1997

[54] ROTATIONAL ARM ASSEMBLY FOR A PRINTING MECHANISM OF A RECORDER AND COPY MACHINE INCORPORATING SAME

[75] Inventors: Yukio Sawano, Tokyo; Mamoru Mizunokura; Kiyoshi Tsukada, both of Nagano, all of Japan

[73] Assignees: Fuji Photo Film Co., Ltd., Kanagawa; Nagano Japan Radio Co. Ltd., Nagano-ken, both of Japan

[21] Appl. No.: 337,813

[22] Filed: Nov. 8, 1994

[30] Foreign Application Priority Data

Nov. 19, 1993 [JP] Japan ................................. 5-314165

[51] Int. Cl.⁶ ............................................. G01D 15/16
[52] U.S. Cl. ..................................... 346/139 R; 347/257
[58] Field of Search ....................... 346/139 R; 347/257, 347/242

[56] References Cited

U.S. PATENT DOCUMENTS

| | | | |
|---|---|---|---|
| 4,297,944 | 11/1981 | Nihira | 400/257 |
| 4,686,540 | 8/1987 | Leslie et al. | 346/139 R |
| 5,084,962 | 2/1992 | Takahashi et al. | 29/833 |

FOREIGN PATENT DOCUMENTS 4-50123  11/1992  Japan.

*Primary Examiner*—Mark J. Reinhart
*Attorney, Agent, or Firm*—Birch, Stewart, Kolasch & Birch, LLP

[57] ABSTRACT

A thermally sensitive recording head comprising, a two bases 2 moving with its attitude being kept along a guide shaft 5, an attachment 3 rotatably provided on the base 2 so that the base 2 extends to an right angle direction with the guide shaft 5 and contacts on or separates from a platen 8, and a heating head 4, which is rotatably provided on the attachment 3, and on front surface of which a heating body train is formed in a right angle direction with the guide shaft 5 and extends in opposite direction to an extending direction of the attachment 3 from the tip end of the attachment 3 to contact on or separate from the platen 8, whereby the attachment 3 and the heating head 4 are pressed on the thermally Sensitive paper placed on back-side of the platen 8. In this arrangement, a clear image can be obtained without generation of irregularity of photographic density because the heating head 4 presses the thermally sensitive papers while being kept always in parallel with the platen 8.

8 Claims, 4 Drawing Sheets

ROTATIONAL ARM ASSEMBLY FOR A PRINTING MECHANISM OF A RECORDER AND COPY MACHINE INCORPORATING SAME

BACKGROUND OF THE INVENTION

I. FIELD OF THE INVENTION

This invention relates to a printing mechanism of a recorder used for an enlarging copy machine or the like for enlarging and printing the image data read from documents.

II. DESCRIPTION OF THE PRIOR ART

Conventionally, a printing mechanism of a recorder for printing through a repeated movement of a printing head in a main scanning direction, includes a thermally sensitive recording head which has been disclosed in Japanese Utility Model Registration Patent Publication No. 4-50123 in 1992.

The thermally sensitive recording head disclosed by such publication comprises a base moving along a guide shaft, an attachment rotatably attached of its one end on the base, and a heating head rotatably provided on a tip end of the attachment, whereby the printing is achieved in that the heating head is pressed on thermally sensitive recording papers and the base repeatedly moves on the guide shaft arranged in the main scanning direction.

Heretofore known is the enlarging copy machine which reads the documents such as A4 size or the like by an image sensor, data-processes thus read image data, and prints the resultant data in enlarged sizes such as A1 or A0 or other sizes. In the enlarging copy machine of this kind, a plurality of printing heads are aligned at predetermined interval in the scanning direction, and each printing head is made to print over a length which is produced in that an entire line-length in the recording paper is partitioned by the number of printing heads.

When the conventional printing mechanism as formerly described is applied to the enlarging copy machine as immediately previously described, the plurality of printing heads are required to be arranged at a predetermined interval on the base that moves along the guide shaft. In concrete, a plurality of attachments, which supports on its tip ends the printing heads, are required to be mounted on each base whose dimension is lengthened corresponding to the number and the position of printing heads.

However, such arrangement makes the base overly lengthy, and a plurality of bearings for supporting the guide shaft must be provided on the base. For this reason, when a slight center-displacement of the bearing is present if any, then non-ununiformity of quality in the mechanism arises together with disturbance of a smooth sliding movement of the base along the guide shaft. When a certain clearance is provided between the bearing and the guide shaft, a mechanical accuracy deteriorates with backlash arising, and in addition, unwanted vibration on moving is generated even in slight clearance. Particularly, the vibration travels to the printing head to considerably deteriorate a printing image quality in the case where a high printing image quality is required as in the enlarging copy machine having a half tone (intermediate tone) printing mode.

SUMMARY OF THE INVENTION

An object of the invention is to provide a printing mechanism for a recorder which secures a smooth sliding movement and rotational displacement of a plurality of printing heads and thereby eliminates non-ununiformity of product quality.

Another object of the invention is to provide a printing mechanism for a recorder capable of obtaining a high quality of printing image by preventing generation of unwanted vibration of the printing head.

To achieve the objects, the invention comprises; a guide shaft 2; a plurality of rotational arms 3, 4, and 5 whose base ends 3b, 4b, and 5b are supported slidably and rotatably in displacement in an axis direction C of the guide shaft 2; a plurality of printing heads 6, 7, and 8 which are rotatably supported on tip ends 3s, 4s, and 5s of each rotational arm 3, 4, and 5; a base 9 which regulates at every predetermined interval a relative position in an axis direction C of each rotational arm 3, 4, and 5 and which is displaced together with the rotational arms 3, 4, and 5; and a driving unit 10 for repeatedly moving the base 9 in the axis direction C.

The rotational arm 4 is provided on its base end 4b with a bearing 11 supporting the guide shaft 2, an engaging shaft 12 which protrudes from one-end of the bearing 11 and engages with the base 9 side, and a flange 12f provided on an inside in an axis direction of the engaging shaft 12, where the tip end 4s is provided with a head supporting base 40 having heat radiation fins 41 which are rotatably supported on a support shaft 39, a serial shaped printing head 7h is attached on the head supporting base 40. The base 9, which is provided with a engaging supporter 13 forming an engaging recess 13s on which the engaging shaft 12 of each rotational arms 4 is rotatably supported, is further provided with a sub base 14 opposing another end of the bearing 11 in the rotational arm 4. A pressing mechanism 15, which forces the rotational arm 4 to pressingly contact on the engaging supporter 13, is provided on the sub base 14. A spring member 16 and a spring pressure controller 17 for adjusting a pressing force of the spring member 16 are provided on the pressing mechanism 15.

In the foregoing, there have been described the structure of the rotational arm 4 and the base 9 side and printing head 7 side relating thereto. The structure of the other rotational arms 3 and 5 and the base 9 side and printing heads 6 and 8 side relating thereto is the same as the rotational arm 4 side and the base 9 side and printing head 7 side relating thereto.

In this way, the base ends 3b, 4b, and 5b of said plurality of rotational arms 3, 4, and 5 are supported slidably and rotatably in displacement in an axis direction C of the guide shaft 2, where the guide shaft 2 is supported on the bearing 11 ... provided on the base ends 4b ... of the rotational arms 4 ....

A relative position in a axis direction C of each rotational arm 3, 4, and 5 is regulated to be a predetermined interval by the base 9 displaced together with each rotational arm 4 .... The engaging shaft 12 protruded from one-end of the bearing 11 provided on the base end 4b of the rotational arm 4 (the other arms 3 and 5 side are the same as the arm 4) is rotatably engaged on the engaging recess 13s in the engaging supporter 13 provided on the base 9. On the other hand, the rotational arm 4 is pressed by the spring member 16 in the pressing mechanism 15 provided on the sub-base 14 opposing to the other end of the bearing 11 in the rotational arm 4. Thereby, both ends of the base end 4b of the rotational arm 4 are placed between the engaging supporter 13 and the pressing mechanism 15, the rotational arm 4 is supported on a regulated position of the base 9, where a pressing force of the spring member 16 is adjusted by the spring pressure controller 17 provided on the pressing mechanism 15.

In the foregoing, the base 9 is not directly supported on the guide shaft 2, the plurality of rotational arms 3, 4, and 5 are independently supported respectively. Thus, there can be prevented an adverse effect of center displacement of each rotational arm 3, 4, and 5, and each rotational arm 3, 4, and 5 in the guide shaft 2 is secured to be slidably moved and rotatably displaced in smooth motion. The base end 4b of the rotational arm 4 (the other rotational arms 3 and 5 sides are the same as in the arm 4) is engaged on its one end with the engaging supporter 13 (the engaging recess 13s), consequently, a tilt for an axis direction of the guide shaft 2 is allowed, a smooth slidable movement and rotatable displacement of the rotational arm 4 can securely be obtained. By adjusting a pressure force of the spring member 16, the rotational arm 4 side pressingly contacts suitably with the engaging supporter 13, and the backlash between the rotational arm 4 and the guide shaft 2 is eliminated. The pressing mechanism 15 thus adjusting is independently provided for each rotational arm 3, 4, and 5, therefore, unwanted vibration is prevented with realization of the smoother slidable movement and rotatable displacement of each rotational arm 3, 4, and 5 on the guide shaft 2.

As a consequence, each rotational arm 3, 4, and 5 comes available in slidable movement and rotatable displacement along the guide shaft 2 under the condition of regulating a relative position in an axis direction C of the guide shaft 2. This enables the base 9 (printing heads 6, 7, and 8) to repeatedly move in the main scanning direction by the driving unit 10. The printing head 7 (the other printing heads 6 and 8 side are the same as the printing head 7) is supported in manner of freedom of rotatable displacement on the tip end 4s of the rotational arm 4, thereby each printing head 6, 7, and 8 can independently parallelly be moved in a right angle direction of the guide shaft 2. Each printing head 6, 7, and 8 is allowed to contact on recording papers transferred in a sub-scanning direction on a platen, thereby the printing operation is thus achieved.

DETAILED DESCRIPTION OF THE PREFERRED EMBODIMENT

The preferred embodiments according to the invention are described in detail in accordance with the drawings.

Figure 6:
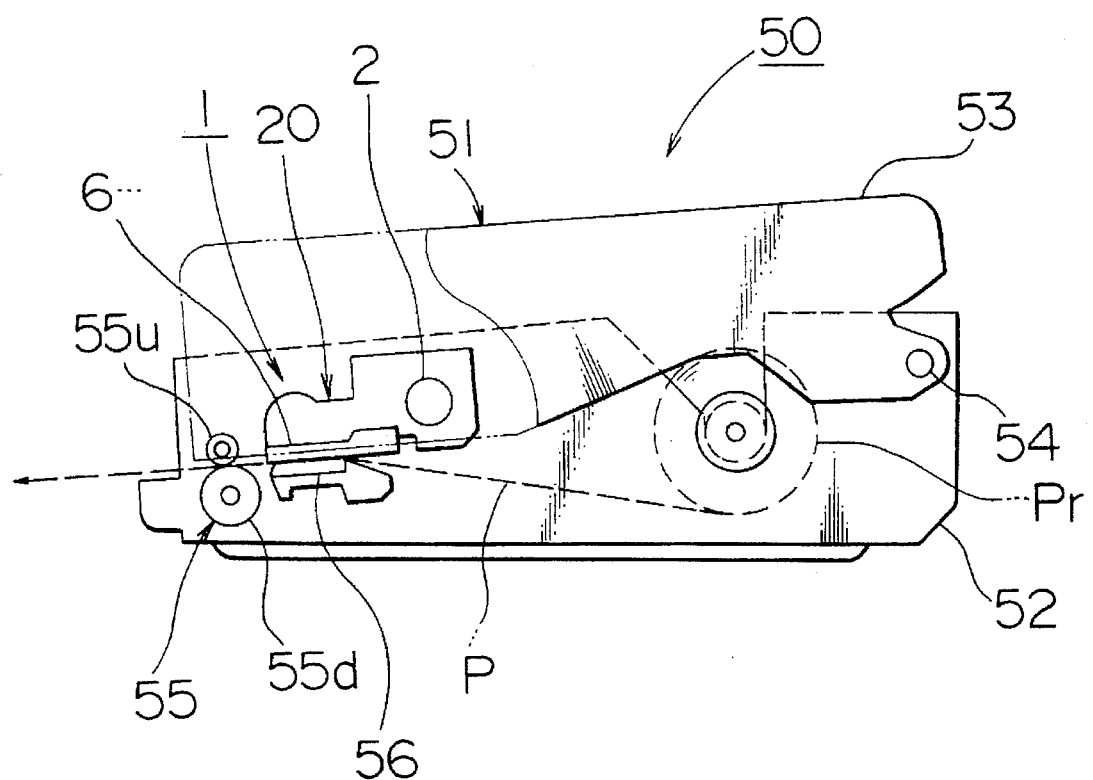
FIG. 6 is a typical side view of an enlarging copy machine having a printing mechanism.

For clear understanding of the invention, the explanation is made for a structure of the enlarging copy machine having a printing mechanism according to the invention referring to FIG. 6.

In the drawing, numeral 50 depicts an enlarging copy machine, having a recorder, which includes a cabinet 51 formed of a lower cabinet half body 52 and an upper cabinet half body 53, where the upper cabinet 53 can open and close upward and downward its front side by a hinge 54 on a back end. A roll paper Pr wound with recording papers (thermally sensitive recording papers) is rotatably set on an intermediate portion of the lower cabinet half body 52, the recording papers P continuously unwound therefrom are transferred by a transfer mechanism 55 provided in front of the cabinet 51, and discharged to the outside. The transfer mechanism 55 is formed of a slave roller 55u provided on the upper cabinet half body 53 and a driving roller 55d provided on the lower cabinet half body 52.

The transfer mechanism 55 is arranged on its backward portion with a printing mechanism 1 according to the present invention. In the printing mechanism 1, 56 depicts a platen, on upper surface of which the recording papers P travel. A printing unit 20 is arranged on upward portion of the platen 56. Thus, the recording papers P are put between the platen 56 and three heads 6 . . . provided on the printing unit 20, the recording papers P are transferred intermittently by the amount corresponding to one line at every line bases to a front direction (sub-scanning direction), and the printing heads 6 . . . are allowed to be repeatedly transferred in the right angle direction (main scanning direction) for the sub-scanning direction, thereby the printing at every line is achieved. FIG. 6 shows only essentials, and a reader and the like of the document are omitted.

Next, a structure of a printing mechanism 1 according to the invention is described referring to FIGS. 1 to 5.

Figure 1:
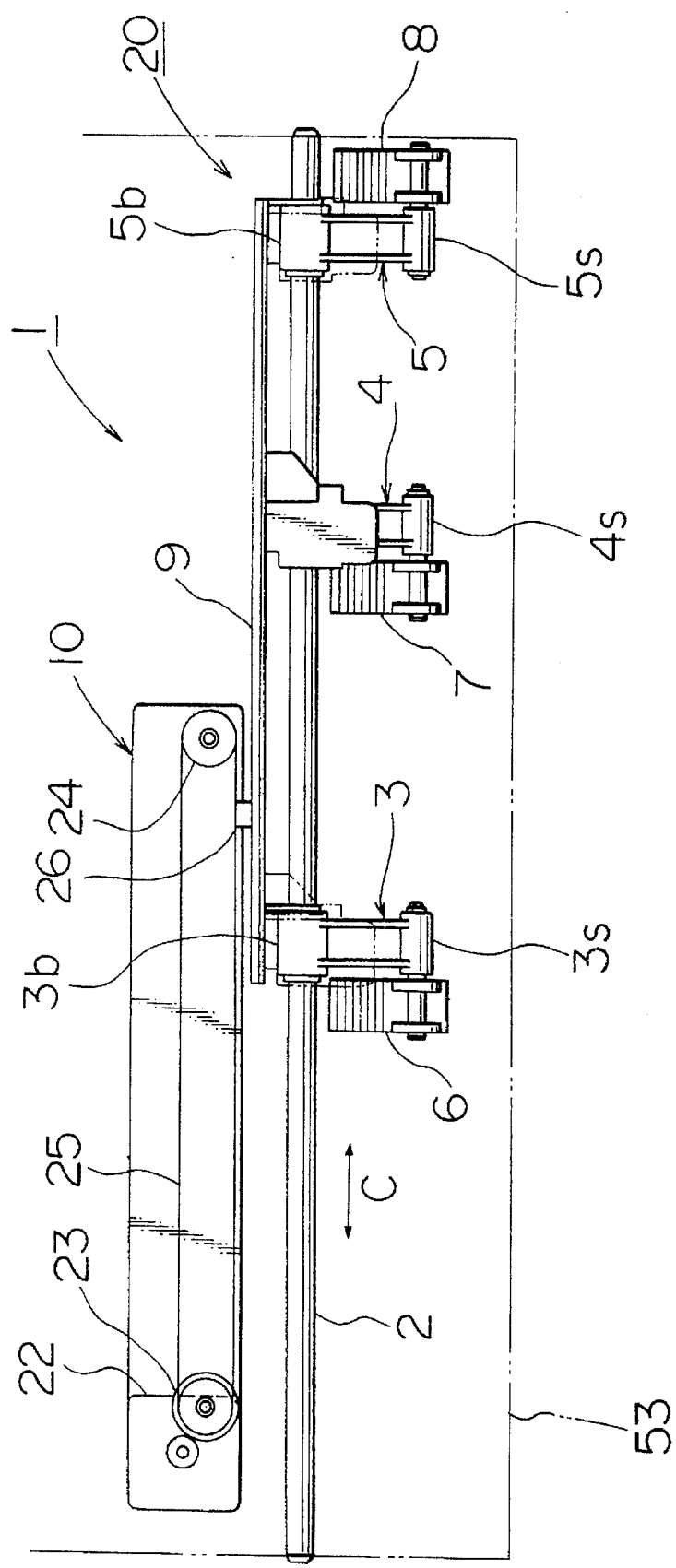
FIG. 1 is a plan view of a printing mechanism including a virtual line on a part thereof according to the invention.

FIG. 1 shows a printing unit 20 of the printing mechanism 1 according to the invention. The printing unit 20 comprises, in large classification, a guide shaft 2, three rotational arms 3, 4, and 5 whose base ends 3b, 4b, and 5b are attached slidably and rotatably in displacement in an axis direction C of the guide shaft 2, three printing heads 6, 7, and 8 which are supported on tip ends 3s, 4s, and 5s of each rotational arm 3, 4, and 5, a base 9 which regulates a relative position in an axis direction C of each rotational arm 3, 4, and 5 at a predetermined interval and is displaced together with the rotational arms 3, 4, and 5, and a driving unit 10 for repeatedly driving the base 9 in the axis direction C.

The guide shaft 2 fixes its both ends on the upper cabinet half body 53 shown by virtual lines, see FIG. 1. The driving unit 10 formed of a driving motor 22, a driving pulley 23 which rotates by the driving motor 22, a slave pulley 24 spaced in an axis direction of the guide shaft 2 from the driving pulley 23, and an endless timing belt 25 which is bridged across the driving pulley 23 and the slave pulley 24. The endless timing belt 25 and the base 9 are coupled by a joint 26.

Figure 2:
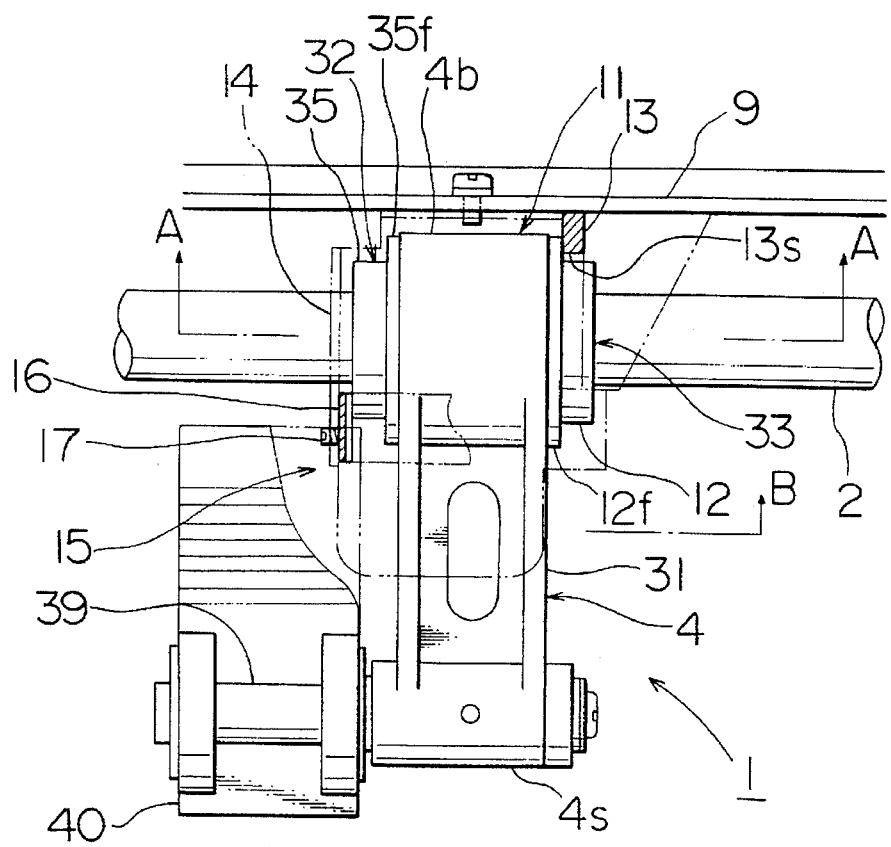
FIG. 2 is a partially-sectional plan view of one rotational arm and its peripheral structure in the printing mechanism.
Figure 3:
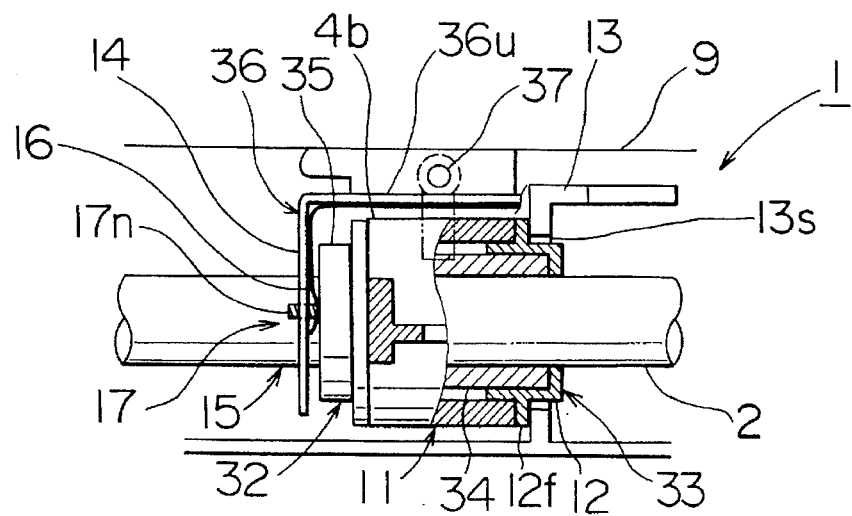
FIG. 3 is an elevational view of one rotational arm and its peripheral structure in the printing mechanism, including a partial sectional view taken along lines A—A and B—B in FIG. 2.
Figure 4:
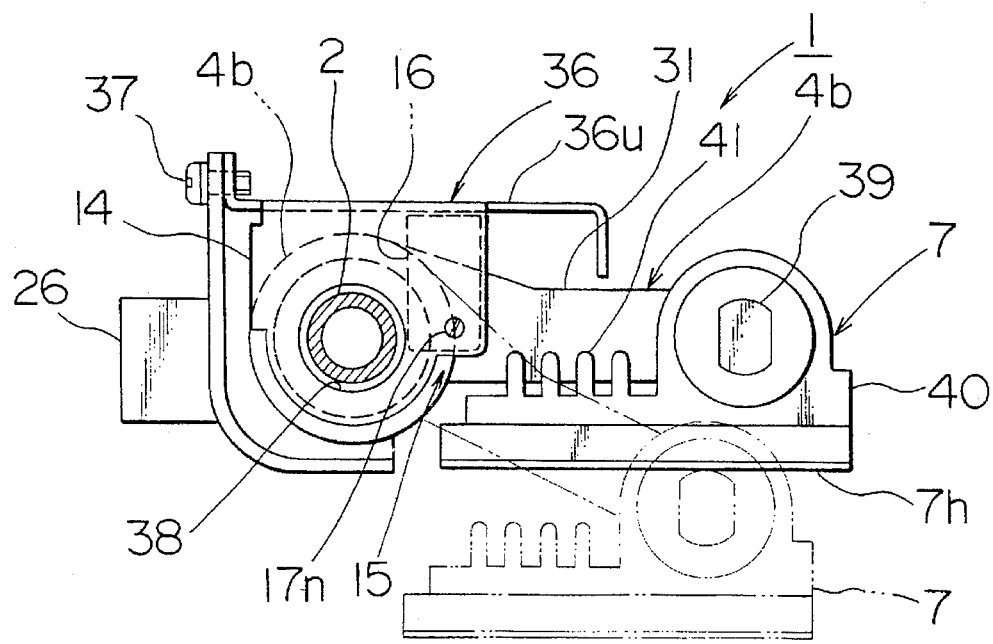
FIG. 4 is a partially-sectional left-side view of one rotational arm and its peripheral structure in a printing mechanism.
Figure 5:
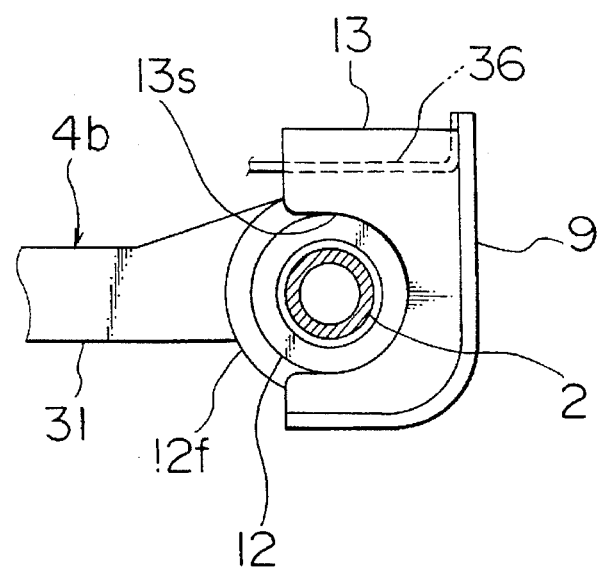
FIG. 5 is a partially-sectional right-side view in which a part of one rotational arm and its peripheral structure is omitted in the printing mechanism.

The rotational arm 4 (the other rotational arms 3 and 5 are the same as the arm 4) are formed into a unit with the base end 4b, the tip end 4s, and an arm body 31 between the base end 4b and the tip end 4s, see FIGS. 2 and 4. The base end 4b is formed into a cylindrical shape, and as shown in FIG. 3, both end openings thereof is attached with support caps 32 and 33, and a bearing collar 34 is supported between the support caps 32 and 33. In this arrangement, a bearing 11 is formed, and the guide shaft 2 is supported on the bearing 11. The support caps 32 and 33 have, on its peripheral surfaces, flanges 12f and 35f each with a large diameter, the flanges 12f and 35f pressingly contact on the both end openings of the base end 4b. Protruded portions from the flanges 12f and 35f to outside in an axis direction come to the engaging shafts 12 and 35.

On the other hand, the base 9 is formed into a L character shaped plate as viewed from side surface, see FIG. 4. An inside predetermined position thereof (regulated position) is formed unitary with the engaging supporter 13 formed of a U character shaped engaging recess 13s, which is engaged with the engaging shaft 12 in the rotational arm 4. A sub-base plate 36, which is entirely formed into L character shape, is fixed on the base 9 by a screw 37. The sub-base plate 36 having a horizontal base 36u has a sub-base 14 opposite to the engaging shaft 35 (the other end of the bearing 11) in the rotational arm 4. A through hole 38 supporting the guide shaft 2 is provided on the sub-base 14. A pressing mechanism 15 is also provided on the sub-base 14. The pressing mechanism 15 has a spring member 16 bent into a L character shape from a flat spring, and one-side of the spring member 16 is fixed on inside surface of the base 36u of the sub-base plate 36 by welding etc. Another-side to be a free end of the spring member 16, in particular, a part of its back-side is allowed to pressingly contact with the engaging shaft 35, see FIG. 3. An adjustment screw 17n forming a spring pressure controller 17 is screwed on the sub-base 14. The adjustment screw 17n penetrates through the sub-base 14, and its tip end contacts with a part of front-side of the spring member 16. Thus, the spring member 16 presses the engaging shaft 35 (rotational arm 4), the flange 12f pressingly contacts on the engaging supporter 13, and rotation of the adjustment screw 17n provides adjustment of a pressure force of the spring member 16.

Such structure of the base 9 side is similarly formed for the rotational arms 3 and 5. In this arrangement, positions of the rotational arms 3, 4, and 5 are set in consideration of a required interval of each printing head 6, 7, and 8.

The tip end 4s of the rotational arm 4 supports a supporting shaft 39, which is allowed to protrude from one-side of the tip end 4s, thus protruded portion supports one back surface-side of a supporting base 40 rotatably in displacement. A serial shaped printing head 7h is mounted on back surface of the head supporting base 40, where the head supporting base 40 and the serial shaped printing head 7h form the printing head 7. Numeral 41 depicts heat radiation fins provided on back surface of the head supporting base 40. Such structure of the printing head 7 is the same as in those of the other printing heads 6 and 8.

A function of each part in the printing mechanism 1 according to the invention is described referring to the drawings.

The three rotational arms 3, 4, and 5 are supported at their base ends 3b, 4b, and 5b slidably and rotatably in displacement on the guide shaft 2.

The relative positions in a sliding direction (axis direction C) of each rotational arm 3, 4, and 5 are regulated and fixed at predetermined interval by the base 9 displaced together with the rotational arms 4 . . . , where the engaging shaft 12 protruded from one-end of the bearing 11 provided on the base end 4b of the rotational arm 4 (the other rotational arm 3 and 5 are the same as this arm 4) is rotatably engaged with the engaging recess 13s in the engaging supporter 13 provided on the base 9. The sub-base 14, provided on the base 9, which is opposed to the other end of the bearing 11 in the rotational arm 4, is pushed by the spring member 16 in the pressing mechanism 15 provided on the sub-base 14, thereby the rotation arm 4 is pressed. Both ends of the base end 4b of the rotational arm 4 are placed between the engaging supporter 13 and the pressing mechanism 15, thus the rotational arm 4 is supported on a predetermined position (regulated position) of the base 9. The pressing force of the spring member 16 is adjusted by the spring pressure controller 17 provided in the pressing mechanism 15.

Only the one-end of the base end 4b of the rotational arm 4 is engaged by the engaging supporter 13 (engaging recess 13s), thus an allowance is given to tilt for an axis direction of the guide shaft 2, and by adjustment of a pressing force of the spring member 16, the rotational arm 4 side suitable pressingly contacts on the engaging supporter 13, this eliminates backlash between the rotational arm 4 and the guide shaft 2. With this structure employed, the rotational arms 3, 4, and 5 are respectively independently formed together with an independent adjustment available at every rotational arm (3, 4, and 5) basis, whereby there can be obtained a smooth slidable movement and rotatable displacement of the rotation arms 3, 4, and 5 on the guide shaft 2. In this arrangement, a printing image quality is thus graded with prevention of unwanted vibration.

The rotational arms 3, 4, and 5, while each relative position in the sliding direction is being regulated, come freely slidable in an axis direction along the guide shaft 2 together with freedom of displacement rotation. Therefore, on controllably driving the driving motor 22, the base 9 moves along the guide shaft 2 and enables to repeatedly move the printing heads 6, 7, and 8, in main scanning direction. The printing head 7 (the other printing heads 6 and 8 are the same as the head 7), having the serial shaped printing head 7h, which is supported rotatably in displacement by the tip end 4s of the rotational arm 4, enables the printing heads 6, 7, and 8 to move independently in parallel each other in a right angle direction of the guide shaft 2 respectively, as shown by virtual lines in FIG. 4. In FIG. 6, each serial shaped head 7h. . . pressingly contacts with the recording papers P transferred above the platen 56 in the sub-scanning direction, thus the printing is achieved. FIG. 6 typically shows the guide shaft 2 and the printing heads 6 . . . of the printing mechanism 1.

Although the invention has been described in detail in connection with the various preferred embodiments, it is understood for those skilled in the art that the present invention is not limited to such embodiments described. In the embodiments, three printing heads (rotational arms) are described, solely for illustration. However according to the invention, the foregoing and two printing heads or four or more printing heads may preferably be used. Therefore, the foregoing and various optional modifications and changes in the constructions and shapes and the like can be made therein without departing from the scope and sprit of the invention.

What is claimed is:

1. A rotational arm assembly for a printing mechanism of a recorder comprising:
    a guide shaft;
    a plurality of rotational arms, each of said plurality of rotational arms having a base end rotatable about the guide shaft and slidable in displacement along a longitudinal axis direction of the guide shaft;
    a plurality of printing heads, one of said plurality of printing heads being rotatably supported on a tip end of each of said plurality of rotational arms;
    a base, displaced together with said rotational arms, which regulates a relative position of the rotational arms in the longitudinal axis direction of the guide shaft at every predetermined interval basis; and
    a driving unit for selectively moving the base in the longitudinal axis direction of the guide shaft.

2. A printing mechanism of a recorder as claimed in claim 1, wherein each rotational arm is provided on its base end with a bearing supporting a guide shaft, an engaging shaft which protrudes from one-end of the bearing and engages with the base-side, and a flange provided in an axis direction inside of the engaging shaft.

3. A printing mechanism of a recorder as claimed in claim 1, wherein each rotational arm is provided on its tip end with a head supporting base rotatably supported by a supporting shaft, and the printing head is mounted on the head supporting base.

4. A printing mechanism of a recorder as claimed in claim 3, wherein heat radiator fins are provided on the head supporting base.

5. A printing mechanism of a recorder as claimed in claim 1, wherein a serial shaped printing head is provided on the printing head.

6. A printing mechanism of a recorder as claimed in claim 1, wherein the base includes, an engaging supporter forming engaging recess to which an engaging shaft of each rotational arm rotatably engages, and a sub-base opposing to another end of the bearing in the rotational arm, a pressing mechanism for pressing the rotational arm to pressingly contact on the engaging supporter is provided on the sub-base.

7. A printing mechanism of a recorder as claimed in claim 6, wherein the pressing mechanism includes a spring member and a spring pressure controller for adjusting a pressing force of the spring member.

8. An enlarging copy machine having a rotational arm assembly for a printing mechanism of a recorder comprising:

a guide shaft;

a plurality of rotational arms, each of said plurality of rotational arms having a base end rotatable about the guide shaft and slidable in displacement along a longitudinal axis direction of the guide shaft;

a plurality of printing heads, one of said plurality of printing heads being rotatably supported on a tip end of each of said plurality of rotational arms;

a base, displaced together with said rotational arms, which regulates a relative position of the rotational arms in the longitudinal axis direction of the guide shaft at every predetermined interval basis; and a driving unit for selectively moving the base in the longitudinal axis direction of the guide shaft.

* * * * *